United States Patent [19]

Guilbault et al.

[11] Patent Number: 4,592,843
[45] Date of Patent: Jun. 3, 1986

[54] METHOD FOR REMOVAL OF ORGANOMETALLICS FROM WASTEWATER

[75] Inventors: Lawrence J. Guilbault; Thomas C. McEntee, both of Topsfield, Mass.

[73] Assignee: Morton Thiokol, Inc., Chicago, Ill.

[21] Appl. No.: 657,118

[22] Filed: Oct. 3, 1984

[51] Int. Cl.$^4$ .............................................. C02F 1/28
[52] U.S. Cl. ..................... 210/692; 210/909; 210/912; 210/914
[58] Field of Search .............. 210/688, 692, 908, 911, 210/912, 914, 502.1, 909

[56] References Cited

U.S. PATENT DOCUMENTS

| | | | |
|---|---|---|---|
| 1,575,907 | 3/1926 | Genter | 210/779 |
| 2,302,552 | 11/1942 | Johnson | 252/10 |
| 3,161,622 | 12/1964 | Harrington et al. | 424/27 |
| 3,327,859 | 6/1967 | Pall | 210/266 |
| 3,345,341 | 10/1967 | Berry | 523/122 |
| 3,597,351 | 8/1971 | Landenburg et al. | 210/688 |
| 3,715,339 | 2/1973 | Rainer | 210/688 |
| 3,959,556 | 5/1976 | Morrison | 428/364 |
| 3,979,292 | 9/1976 | Kuhn | 210/90 |
| 4,079,001 | 3/1978 | Haase et al. | 210/911 |
| 4,238,328 | 12/1980 | Bowes et al. | 210/502.1 |
| 4,256,588 | 3/1981 | Hoehn et al. | 210/692 |
| 4,483,771 | 11/1984 | Koch | 210/490 |

FOREIGN PATENT DOCUMENTS

| | | |
|---|---|---|
| 2355893 | 5/1974 | Fed. Rep. of Germany. |
| 49-41270 | 11/1974 | Japan .................. 210/688 |
| 686992 | 9/1979 | U.S.S.R. ............... 210/764 |

Primary Examiner—Peter Hruskoci
Attorney, Agent, or Firm—Gerald K. White

[57] ABSTRACT

Organometallic compounds, such as 10, 10'-oxybisphenoxarsine, are removed from aqueous media by preferential absorption onto solid polyamide absorbents, such as Nylon, in the form of pellets, fibers, granules, film or coatings.

7 Claims, 2 Drawing Figures

METHOD FOR REMOVAL OF ORGANOMETALLICS FROM WASTEWATER

CROSS REFERENCE TO OTHER APPLICATIONS

This application is related in subject matter to four other applications that were filed concurrently with this application and were commonly assigned. They are: Application Ser. No. 657,119, invented by Lawrence J. Guilbault, Thomas C. McEntee, and Judith L. Koob and entitled "Method for Controlling Antimicrobial Content of Fibers"; Application Ser. No. 657,116, invented by Michael M. Cook and entitled "Antimicrobial Adjustment Technique"; Application Ser. No. 657,117, invented by Thomas C. McEntee, Lawrence J. Guilbault, Judith L. Koob and James F. Brophy and entitled "Method for Incorporating Antimicrobials into Fibers"; and Application Ser. No. 657,278, invented by Thomas C. McEntee, Lawrence J. Guilbault, Judith L. Koob and James F. Brophy and entitled "Method for Incorporating Antimicrobials into Fibers".

BACKGROUND OF THE INVENTION

This invention generally pertains to the removal of organometallic compounds from aqueous media. The removal is accomplished with use of polyamide absorbing materials such as Nylon 6 or Nylon 66.

Many organometallic chemicals have toxicological properties that render such materials injurious to man, lower animals, fish and other life forms. Organometallic compounds of mercury, tin and lead are particularly hazardous materials and, accordingly, considerable effort has been expended to minimize environmental contamination by these classes of compounds.

Organometallic compounds are generally non-ionic, but are sufficiently polar to result in finite solubility in aqueous media. Often, such compounds are extremely toxic to fish; for example, low parts per million concentrations in manufacturing plant effluents can result in ecological damage.

The removal of trace levels of organometallic compound contaminants from aqueous media is difficult to achieve. The contaminants are not sufficiently ionic to be efficiently removed by conventional ion exchange resin treatment technology. Likewise, the compounds are often too polar in nature to permit efficient removal by absorption into activated carbon because such absorbant type is generally more effective with non-polar organic contaminants.

It is known to use polyamide absorbents to separate blood cells. In this regard, please see U.S. Pat. No. 4,256,588. In addition, U.S. Pat. No. 4,079,001 discloses the removal of anionic and cationic dyes from industrial effluents with use of polyamide absorbents. Also, U.S. Pat. No. 4,059,512 treats biological fluids with polyamide absorbents to remove endotoxin, a lipopolysaccharide. However, none of the above mentioned patents teaches the use of such absorbents to remove organometallic contaminants from aqueous media.

SUMMARY OF THE INVENTION

This invention generally pertains to a method for reducing the concentration of organometallic compounds that are contained in aqueous media. The method involves contacting the above described aqueous media with a solid polyamide material which absorbs at least a portion of the organometallic compound and thereby results in a lower concentration of the organometallic compound in the media.

DETAILED DESCRIPTION OF THE INVENTION

Figure 1:
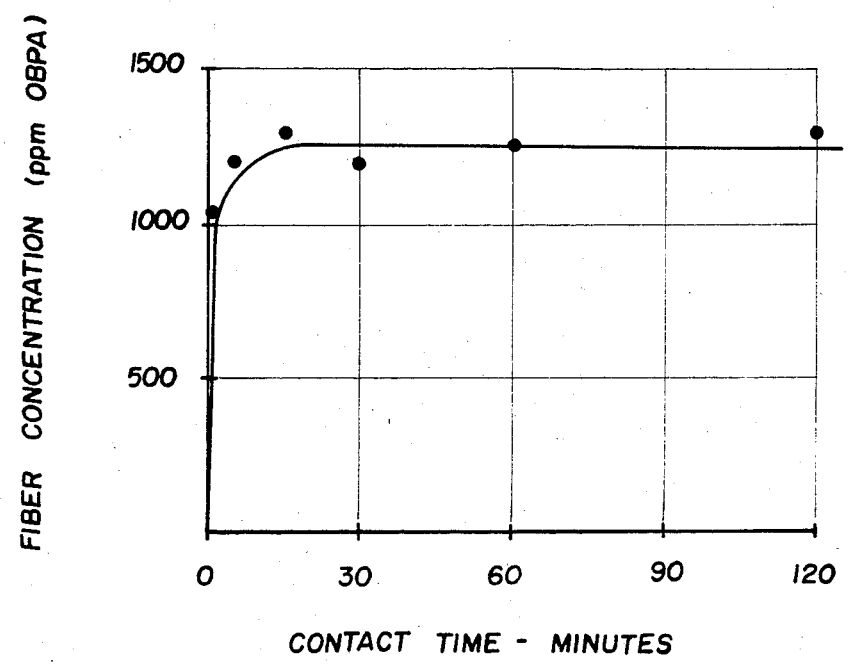
FIG. 1 depicts the rapid absorption of an organoarsenical compound from water into a polyamide fiber as a function of time, under the conditions descrbed in Example 1.

It has been discovered that the concentration of organometallic compounds in aqueous media can be substantially reduced by contacting organometallic compound containing aqueous media with a solid polyamide absorbent in the form of fibers, granules, film or coatings. Organometallic compounds exhibit a high affinity toward polyamide absorbents, relative to the aqueous phase. Partition coefficients, i.e., the ratio of organometallic compound absorbed by the polyamide absorbent relative to that retained in the aqueous phase, at equilibrium, can be very high, ranging from 10:1 to 100:1 or higher. These favorable partition coefficients enable substantial removal of organometallics from aqueous media simply by contacting and thereby equilibrating the aqueous media with a polyamide absorbent to facilitate rapid absorption of the organometallic compound by the polyamide.

This invention pertains to a method for removing or reducing the concentration of organometallic chemical contaminants in aqueous media by contacting with a polyamide absorbent. Organometallic contaminants which can be so treated include compounds of the organotin, organolead, organomercury, organobismuth, organoselenium, organotellurium and organoarsenic types as well as other similar organometallic compounds which could represent an ecological hazard if aqueous streams containing appreciable quantities of these materials were discharged into the environment. To be effectively removed by the process of this invention, the organometallic contaminant must have some finite solubility in water, which in many cases may be in the low part per million range.

Typical organometallic compounds that may be removed from aqueous media include but are not limited to the following: phenylmercuric acetate ($HgC_8H_8O_2$); tetraethyl lead ($PbC_8H_{20}$); bismuth acetate ($BiC_6H_9O_5$); 10,10'-oxybisphenoxarsine ($C_{24}H_{16}As_2O_3$); and phenylselenol ($SeC_6H_6$).

Polyamides useful as absorbents in this invention are conventional aramid polymeric materials containing the amide linkage

and typified by solid polyamide polymers known generically as nylon. Included in the list of useful polyamides are those nylons designated as nylon 6, nylon 66, nylon 7, nylon 11.

The polyamide absorbent may be in any suitable solid form to facilitate efficient contact with the aqueous media containing the organometallic compound to be removed. Suitable solid forms may include granules, pellets, free-standing films, coatings on suitable substrates and fibers. Due to their favorable surface-to-volume ratio, fibers, or yarns and fabrics, including nonwovens, produced from polyamide fibers are preferred.

The invention may be practiced by simply contacting the organometallic compound containing aqueous media with a polyamide absorbent for sufficient time to allow all or a desired proportion of the organometallic contaminant to be absorbed by the polyamide absorbent. This contact method may be by either batch or continuous processes. The efficiency of removal is governed by the proportion of organometallic compound present, relative to the quantity of polyamide absorbent employed and the amount of aqueous media to be treated. The rate of removal is determined by factors that affect the attainment of equilibrium partitioning of the organometallic compound between the polyamide and aqueous phases. These factors include contact time, temperature, pH and surface area to volume ratio of the polymeric absorbent.

While not desiring to be bound by the following explanation, it is believed that the beneficial effects of polyamide absorbents in removing or reducing the concentration of organometallic compounds in aqueous media is due to the following. First, organometallic compounds, being somewhat polar yet decidedly organic in nature appear to have a solubility preference for polyamide relative to water. The generally low water solubility of many organometallic compounds tends to support this preference.

Secondly, polyamides in general, and nylon in particular are well known to absorb appreciable quantities of water under equilibrium conditions, up to 10–15% by weight in some instances. Thus the preferance of organometallic compound for polyamide over water and the ease by which water is absorbed into polyamide provides a driving force and transport mechanism by which organometallic compounds are absorbed from aqueous media into polyamide absorbent.

The following Examples serve to demonstrate the practice of the invention.

EXAMPLE I

This example demonstrates the preferential solubility of organometallic compounds in polyamide absorbent relative to water. An aqueous solution (80 ml) containing about 47 ppm of an organoarsenic compound, 10, 10'-oxybisphenoxarsine, was heated at 95°–100° C. and 0.8 grams of Nylon 6 fiber in the form of knit fabric was added to the boiling path. Small fiber aliquots were removed at various time intervals and analyzed for the presence of the organoarsenic compound in the fiber. The results, depicted in FIG. 2, demonstrate that the organoarsenical is rapidly absorbed by the nylon fiber, reaching an equilibrium concentration of about 1200 ppm in the fiber within five minutes. Using the concentration of organoarsenical absorbed by the fiber, and the water-to-fiber ratio, the concentration of organoarsenical remaining in the water phase after absorption was calculated to be 29 ppm.

EXAMPLE II

In this example, 0.5 gram samples of nylon yarn were placed in 10 ml aliquots of a solution containing 28.8 ppm of the ogranoarsenical employed in Example 1, and then maintained at the 40° C. Yarn samples were removed at various time intervals and the bath and fiber analyzed for organoarsenical content. The results are listed in the Table.

TABLE

| | Organoarsenical Concentration (ppm) | |
|---|---|---|
| Time (Minutes) | Final Bath Concentration | Fiber Concentration |
| 0 | 28.8 | 0 |
| 0.5 | 20.8 | * |
| 1.0 | 17.4 | 280 |
| 2.0 | 15.8 | * |
| 3.0 | 13.4 | * |
| 5.0 | 14.2 | * |
| 10.0 | 11.7 | 380 |
| 15 | 8.9 | * |
| 30 | 8.4 | * |
| 60 | 6.9 | 410 |

*not alalyzed

Figure 2:
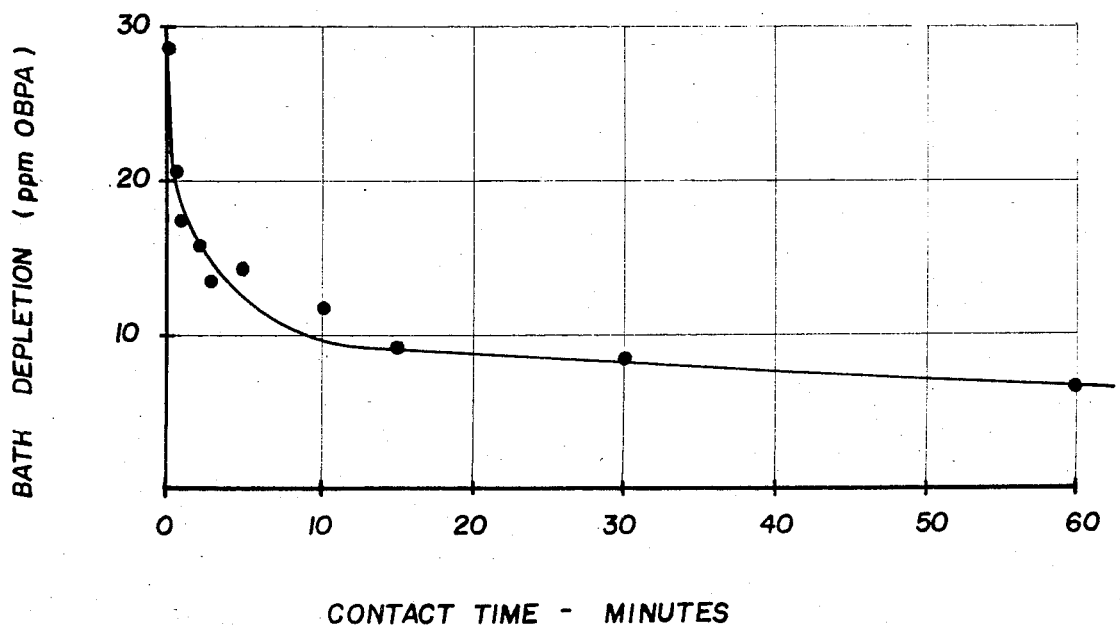
FIG. 2 depicts the rapid reduction in concentration of an organoarsenical compound in water upon absorption by polyamide fibers under the conditions described in Example 2.

This experiment demonstrates that the concentration of an organoarsenical compound in water can be reduced by a factor of greater than 4.1 (e.g. 28.8/6.9) by contacting the contaminated water with a polyamide fiber absorbent, at a water to fiber ratio of 20:1. FIG. 2 depicts this reduction in organoarsenical content as a function of time.

EXAMPLE III

In this example, 1.0 g samples of nylon yarn were used to treat solutions containing ca. 50 ppm organotin, bis(tri-n-butyl tin) oxide and 0.1% TRITON-X-100 surfactant at 90°–95° C. for 30 minutes. Bath ratios, fiber concentrations, and final bath concentrations are shown in the Table.

TABLE

| | Organotin Concentration (ppm) | | |
|---|---|---|---|
| Bath volume (mL): Nylon fiber wt (g) | Initial Bath Concentration | Final Bath Concentration | Fiber Concentration |
| 20:1 | 50 | 18 | 639 |
| 100:1 | 50 | 24 | 2534 |

This experiment shows that the concentration of an organotin compound in water can be reduced by a factor of almost 3 by contacting the contaminated water with a polyamide absorbent at a water to fiber ratio of 20:1.

We claim:

1. A method for reducing the concentration of organometallic nonionic compounds selected from the group consisting of organotin, organolead, organomercury, organoarsenic, organobismuth, organoselenium, organotellurium, and admixtures thereof from aqueous media, comprising contacting said aqueous media containing an initial concentration of at least one of said organometallic nonionic compounds with sufficient solid polyamide absorbent material to cause said polyamide material to absorb at least a portion of said organometallic compound from said media and separating said absorbent and said aqueous media folowing said contacting step to thereby obtain a concentration of said organometallic compound in said aqueous media that is lower than said initial concentration.

2. The method of claim 1, wherein:
said organometallic compound is organoarsenic.

3. The method of claim 2, wherein:
said organoarsenic is 10, 10'-oxybisphenoxarsine.

4. The method of claim 3, wherein:
said polyamide material is Nylon.
5. The method of claim 4, wherein:
said Nylon is in the form of a fiber.
6. The method of claim 1, wherein:
said polyamide material is Nylon.
7. The method of claim 1, wherein:
said polyamide material is in the form of a member selected from the group consisting of a pellet, a fiber, a granule, a film, and a coating.

* * * * *